Sept. 25, 1951  A. BERTEA  2,568,982
MECHANICALLY OPERATED CHECK VALVE
Filed Dec. 2, 1949

INVENTOR.
ALEX BERTEA deceased
BY by H. DEXTER McKAY executor
Wm Edward Hann
Attorney Patented Sept. 25, 1951

2,568,982

UNITED STATES PATENT OFFICE 2,568,982

MECHANICALLY OPERATED CHECK VALVE

Alex Bertea, deceased, late of Pasadena, Calif., by H. Dexter McKay, executor, Puente, Calif.

Application December 2, 1949, Serial No. 130,692

4 Claims. (Cl. 277—43)

This invention relates to check valves provided with means for manually releasing the valve when desired, and particularly to check valves used in high pressure systems in which the differential pressure across the check valve may be of the order of 3000 to 4000 pounds per square inch.

In releasing such valves considerable force has to be exerted in order to overcome the high back pressure acting to hold the valve closed, and the application of sufficient force to the operating means of the valve may present considerable difficulty.

It is the general object of the invention to provide a construction of manually releasable high pressure check valve, in which the force necessary to operate the valve is much reduced as compared with that required to operate such valves as hitherto constructed.

Valves incorporated in high pressure systems are subject to severe conditions due to the forces acting to hammer the valves against their seats, and it is a further object of the invention to provide a check valve construction including a member effecting to direct the flow of the fluid in desired manner over the valve seats.

Due to the severe conditions under which check valves operate in high pressure systems, it is desirable that the valve may be readily taken apart for renewal of worn parts and another object of the invention is to provide a valve construction in which the parts positioned in the valve housing are held in assembled relation by a single threaded plug.

Other object and advantages of the invention will be apparent from a study of the following specifications, read in connection with the accompanying drawing, wherein Fig. 1 is a longitudinal section through the check valve of the invention, showing the parts in closed position, main and supplementary valve members being shown seated;

Fig. 6 is a fragmentary section, drawn on a larger scale, of the valve members shown in Fig. 1, but with the supplementary valve shown as raised from its seat at the commencement of manual opening of the check valve.

Figure 1:
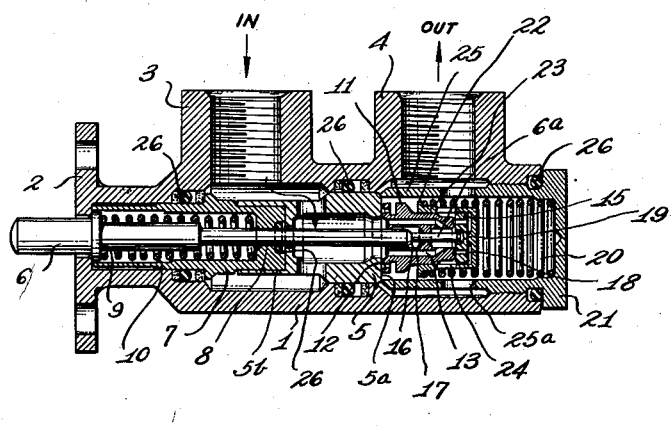
Figure 3:
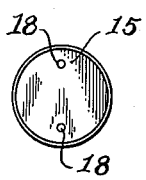
Fig. 3 is a face view of a disk forming a supplementary valve, drawn on the scale of Fig. 2, and shown in Fig. 1.
Figure 2:
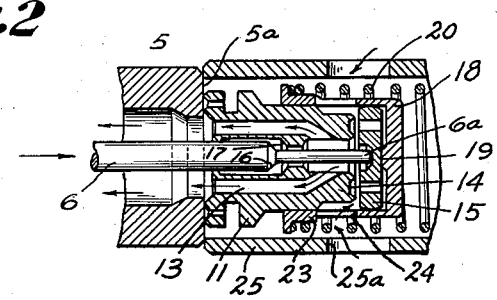
Fig. 2 is an end view, drawn on a larger scale, of a guide for a coil spring urging the valve members to closed position and shown in Fig. 1.
Figure 4:
Fig. 4 is a perspective view, looking from the right in Fig. 1, of the main valve member.
Figure 5:
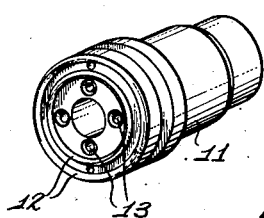
Fig. 5 is a perspective view of the main valve member shown in Fig. 4 but looking at the opposite end of the member to that shown in Fig. 4.

In the drawings, the reference character 1 indicates a tubular valve housing provided with a mounting flange 2, an inlet port provided by an interiorly threaded lateral tubular projection 3 and an outlet port provided in an interiorly threaded lateral tubular projection 4. Inlet and outlet pipes (not shown) will of course be secured in the tubular projections.

A thick ring 5 is mounted in the casing 1 between the inlet and outlet ports, and the side face of said ring 5 toward the outlet port provides a seat 5a for the main valve, later described.

An operating stem or plunger 6 is guided for axial movement in the valve housing in a tubular mounting member 7 secured in the housing, and which is drilled at its inner end to provide a bearing 8 centering the plunger in the tubular housing and guiding it for axial movement. At its outer end the plunger projects through a hole in the mounting flange, a collar 9 on the plunger limiting its outward movement. A coiled compression spring 10 is arranged between flange 9 and the inner end of the tubular mounting member 7 and normally holds the plunger in outward or inoperative position.

The inner end of the plunger stem acts to center the valve elements as well as to move them to open position when it is desired to release the pressure in the outlet port. The valve elements comprise a main valve 11 of cylindrical form provided on the face working against valve seat with a pair of concentric seat engaging rings 12 of generally triangular cross section, and with passages 13 through the body of the valve opening into the opposite face of the main valve, which provides a valve seat 14 for the supplementary valve 15.

The body of the valve 11 is provided with a central longitudinal bore having one portion of a diameter to slide on the stem 6, and an outer portion of a reduced diameter to receive the outer end 6a of the stem which is reduced in diameter. The shoulder 16 between the portions of the stem of different diameter provides an operative surface adapted to engage the shoulder 17 between the central bores of different diameter in the main valve body. It will be noted that the portion 6a of smallest diameter of the operating plunger is longer than the length of the small diameter bore in the valve body and will therefore project through the valve seat 14 to unseat the supplementary valve 15 before shoulder 16 engages shoulder 17, to unseat the main valve 11 when the operating stem 6 is pressed inwardly into the valve housing.

Valve seat 14 is preferably provided with concentric triangular sealing rings similar to rings 12 on the opposite end face of the main valve.

Figure 7:
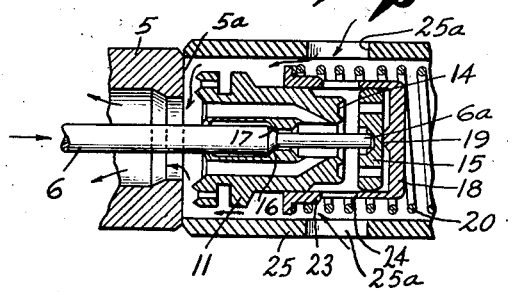
Fig. 7 is a fragmentary section similar to Fig. 6, but showing the main valve as well as the supplementary valve open.

The supplementary valve 15 is formed as a thick disk with a rounded edge and has a diameter very slightly less than that of the valve seat 14. Supplementary valve 15 is held in operative position relatively to valve seat 14, and resilient force applied to both the supplementary and main valve 15 and to urge them toward closed position, by means of a cap 18 having a central inwardly extending, substantially spherical projection 19 bearing against the center of the disk 15, and a coiled compression spring 20 arranged between a tubular plug 21 closing the end of the housing 1, and an outwardly extending flange 22 at the foot of a skirt 23 extending from cap 18 over the outside of the main valve body. The skirt 23 is provided with holes 24 for the passage of fluid passing through the supplementary valve 15 (Figs. 6 and 7).

The exterior surface of tubular plug 21 is provided with a threaded portion adapted to be screwed into an interior screw threaded portion of the housing 1 and is provided with a tubular extension 25 extending around the main and supplementary valves into engagement with ring 5, and is provided with openings 25a therethrough. Ring 5 is provided with an extension 5b into which the inner end of the tubular mounting member 7 of the plunger is fitted.

By the described construction it will be noted that the plug 21 is effective to hold all interior parts of the housing in position in the housing, but it will be understood that the interior parts may be arranged differently, if desired.

O-ring pressure tight packing 26 is arranged between the inlet and outlet ports and the outer surface of ring 5, and between the housing and parts mounted therein to prevent leakage of pressure fluid from the inlet to the outlet ports and around the valves, as well as to prevent leakage of fluid out of the housing or into the operating stem mounting. The operation of the check valve of the invention is as follows, it being assumed that the valve is inserted in a high pressure hydraulic line in which the back pressure in the outlet port may be upwardly of 2000 pounds to the square inch.

Fluid is forced, as for instance by a plunger pump, into the inlet port, and impinges against the main valve 11, raising the valve from its seat, and flowing over valve seat 5a through the holes 25a in the extension 25 of plug 21 into the outlet port 4. The incoming fluid also flows through the passages 13 in the main valve, forcing the supplementary valve 15 off its seat, and flowing outwardly through the apertures 24 in the skirt of the cap 18, and through holes 25a into the outlet port.

The instant the pump stroke is completed, the back pressure, aided by the force of spring 20, will return the main and auxiliary valves into sealing engagement with their valve seats. It should be noted that the force of the fluid in the outlet port acting on the main valve is applied peripherally thereto and parallel to the axis of the valve, since the fluid has to pass through the holes in the extension of the tubular plug and then pass between the extension and exterior of the valve to act against the back of the sealing face thereof. The closed valves will now be supporting the full pressure of the trapped fluid.

If it is now desired to relieve the trapped pressure fluid, the operating stem 6 is pushed inwardly and will first raise the auxiliary valve 15 from its seat which, because of the relatively small area of this valve, may be effected with comparative ease. Immediately the auxiliary valve is cracked open, pressure will be reduced in the outlet port and increased on the inlet side of the main valve, thus reducing the differential pressure acting on it, so that as the operating stem is moved sufficiently to bring the shoulder 16 thereon against shoulder 17 on the main valve, the latter can also be cracked open, fully releasing the pressure in the outlet port.

When the operating stem is released, spring 10 returns to inoperative position out of contact with valves 11 and 15, and spring 20 returns the valves to closed position.

It is evident that the effort necessary to move the plunger may be reduced by fitting any desired arrangement of leverage for increasing the force exerted by the operator and applying the increased force to the operating stem, as is well understood in the art.

From the above description it will be apparent that there has been provided a check valve construction, particularly adapted to use in high pressure hydraulic systems, which check valve although of relatively small size and simple construction is very efficient in use. The check valve is readily taken down for inspection and replacement of worn parts and quickly reassembled.

While a preferred embodiment of the invention has been shown and described, it is to be understood that the invention is not limited to any of the details of construction shown and described herein, except as defined in the appended claims.

What is claimed is:

1. In a check valve, the combination of: a valve housing provided with an inlet and an outlet; an annular main valve seat positioned in the housing; a main valve member cooperating with said valve seat; a supplementary valve seat formed on the main valve member and passages extending through the main valve member and opening into said supplementary valve seat, both main and supplementary valve seats being positioned in the direct path of fluid flowing through the check valve; a supplementary valve cooperating with said supplementary seat; a cap member arranged for sliding movement on the exterior surface of the main valve member and extending over the supplementary valve seat thereof; a disk, constituting a supplementary valve, maintained in operative relation to said supplementary valve seat by said cap; an end closure member for said housing; a spring arranged between said closure member and said cap and effective to yieldably urge both the main and supplementary valves toward their respective valve seats; and an operating member effective to guide the main valve member in its movement, and when operated, to first engage with and open the supplementary valve and then the main valve.

2. In a check valve, the combination of: a valve housing provided with an inlet and an outlet; an annular main valve seat positioned in the housing; a main valve member cooperating with said valve seat; a supplementary valve seat formed on the main valve member and passages extending through the main valve member and opening into said supplementary valve seat, both main and supplementary valve seats being positioned in the direct path of fluid flowing through the check valve; a supplementary valve cooperating with said supplementary seat; a cap member arranged for sliding movement on the exterior surface of the main valve member and extending over the supplementary valve seat thereof; a disk, constituting a supplementary valve, maintained in operative relation to said supplementary valve seat by said cap; an apertured tubular member mounted in said housing and extending around the main and supplementary valves and acting to direct the flow of fluid between the valves and the outlet of the housing; spring means urging both the main and supplementary valves toward closed position; and an operating member effective to guide the main valve member in its movement and, when operated, to first engage with and open the supplementary valve and then engage and open the main valve.

3. In a check valve, the combination of: a tubular valve housing having an inlet and an outlet; an annular main valve seat positioned in the housing; a cylindrical main valve member in cooperative relation with said main valve seat and having a central axial bore therethrough, a supplementary valve seat formed on the main valve member and passages extending through the main valve member and opening into said supplementary valve seat, both main and supplementary valve seats being positioned in the direct path of fluid flowing through the check valve; a supplementary valve cooperating with said supplementary seat; means mounted on said main valve member for positioning and guiding the supplementary valve to and from its seat; a plug closing one end of the valve housing and an apertured tubular extension arranged around the main and supplementary valves and acting to direct the flow of fluid between the valves and the outlet of the housing; spring means arranged between the plug and the cap extending over the supplementary valve and acting to urge the main and supplementary valves toward closed position; an operating stem having a shoulder toward one end; a mounting member for said stem fitted into said housing at the inlet end thereof and providing at its inner end a bearing for said stem positioning it axially in the valve housing and guiding the stem for axial movement in the housing, the shouldered end of the stem being slidably engaged in the central bore in the main valve member to center the main valve member and to move it at times to open position and the opposite end of the stem projecting outwardly of the housing through an opening in said housing to enable said stem to be operated; and fluid tight packing arranged to prevent leakage of fluid through the opening in the housing for the passage of the stem.

4. In a check valve, the combination of: a tubular valve housing having an inlet and an outlet; a ring mounted in said housing between the inlet and outlet thereof, the side of the ring toward the outlet providing an annular main valve seat, and a tubular extension of said ring toward the housing inlet; an operating stem having a shoulder toward one end; a tubular mounting member for said stem having one end fitted into the inlet end of said housing and fitted at its opposite end into the tubular extension of said ring, the inner end of the mounting member providing a bearing positioned axially of the tubular housing for the operating stem; a screw-headed plug closing the outlet end of the housing beyond the outlet; an apertured tubular member extending from said plug into engagement with the outer rim of the main valve seat, the plug being effective to hold the stem mounting and ring seat parts fitted in place in the housing; a cylindrical main valve member in cooperative relation with said main valve seat and having a central axial bore therethrough; a supplementary valve seat formed on the main valve member and passages extending through the main valve member and opening into said supplementary valve seat, both main and supplementary valve seats being positioned in the direct path of fluid flowing through the check valve; a supplementary valve cooperating with said supplementary seat; means mounted on said main valve member for positioning and guiding the supplementary valve to and from its seat; and a coil spring positioned between the means positioning and guiding the supplementary valve and said screw-threaded plug and urging the main and supplementary valves to closed position, the shouldered end of the operating stem being slidably engaged in the central bore in the main valve member to guide the valve in its movement in the housing and to open the main valve against the resistance of said spring means when the stem is operated by engagement of the shoulder with the main valve member, the end of said operating stem being effective to engage and open the supplementary valve before engagement of said shoulder with the main valve.

H. DEXTER McKAY,
*Executor of the Estate of Alex Bertea, Deceased.*

REFERENCES CITED

The following references are of record in the file of this patent:

UNITED STATES PATENTS

| Number | Name | Date |
|---|---|---|
| 1,215,146 | Haeseler | Feb. 6, 1917 |
| 2,355,692 | Allen | Aug. 15, 1944 |